United States Patent Office.

WILLIAM MANNING, OF CHELMSFORD, MASSACHUSETTS.

Letters Patent No. 73,018, dated January 7, 1868.

IMPROVED CONFECTION OR CAKE.

The Schedule referred to in these Letters Patent and making part of the same.

TO ALL WHOM IT MAY CONCERN:

Be it known that I, WILLIAM MANNING, of Chelmsford, in the county of Middlesex, and State of Massachusetts, have invented and produced a new combination of matter, which I term a Combination-Cake; and I do hereby declare that the following is a full and exact description thereof, reference being had to the accompanying specimens of ingredients, making a part of this specification.

This invention consists of pulverized prepared parched corn, ground or grated cocoa-nuts, and boiled molasses, sugar, or sirup.

To enable others skilled in the art to make and use my invention, I will proceed to describe its several parts, how prepared and compounded.

The corn is parched and ground to any degree of fineness desired, and the coarser particles separated from the finer by sifting, if required. The cocoa-nut is either ground or grated to the required fineness, and may be used in this state, or pressed dry and sifted, then used. The sweetening-properties, which may be either molasses, sugar, or sirup, are suitably prepared by boiling to a proper consistency. These several ingredients, which are to form the combination-cake, being thus prepared, are compounded as follows: The sweetening-ingredients, whether molasses, sugar, or sirup, the required quantity of which is put into a vessel and heated to not less than 212° nor over 250° Fahrenheit. When in this heated state, the required quantity of grated or ground cocoa-nut is added and thoroughly stirred with a proper instrument. By this operation the cocoa-nut is cooked enough to prevent the same from moulding or souring. Then the required quantity of pulverized prepared parched corn is added, which is also thoroughly stirred, completely mixing these several ingredients. This composition is then ready to be formed into a cake, of any desired size, form, or shape.

My proportions for the above combination-cake are one part molasses, sugar, or sirup, one part of ground or grated cocoa-nut, and two parts of pulverized prepared parched corn. This proportion may be varied to suit the taste of the user.

What I claim as my invention and production, and desire to secure by Letters Patent, is—

A new and improved combination-cake, as herein described, using for that purpose the aforesaid ingredients or composition of matter, or any other substantially the same, and which will produce the intended result.

WILLIAM MANNING.

Witnesses:
GILBERT A. A. PEVEY,
GEORGE E. PEVEY.